July 1, 1969

L. D. BELL 3,452,764

PIPELINE WELDER'S TENT

Filed Sept. 18, 1967

INVENTOR
LOREN D. BELL

BY Semmes & Semmes

ATTORNEYS

July 1, 1969 L. D. BELL 3,452,764
PIPELINE WELDER'S TENT
Filed Sept. 18, 1967 Sheet 2 of 2

INVENTOR
LOREN D. BELL
BY Semmes & Semmes
ATTORNEYS

United States Patent Office 3,452,764
Patented July 1, 1969

3,452,764
PIPELINE WELDER'S TENT
Loren D. Bell, 514 Ella St., Beatrice, Nebr. 68310
Filed Sept. 18, 1967, Ser. No. 668,359
Int. Cl. A45f 1/06, 1/16; E04f 10/04
U.S. Cl. 135—1    8 Claims

ABSTRACT OF THE DISCLOSURE

A portable pipeline welder's tent or enclosure attachable at one end circumferentially of a pipe section being welded or worked upon and at its other end defining a pipe worker environment protected from the elements.

BACKGROUND OF THE INVENTION

Field of the invention

Pipeline welding and related activities in construction and maintenance of pipelines are carried out in a narrow area longitudinally adjacent to the pipe sections which are laid end to end. Heretofore, there has not been an effective portable device for shielding the pipeline worker from the elements as he is carrying out the welding, repair or construction activity. Earlier inventors have developed small tents for use on cylindrical pipe but these tents or plastic shields, for the most part, cover only a small portion of the pipe so as to protect that portion being worked upon from inclement weather and the like. There has been no provision for enclosure of the worker himself within an environment which could enhance his working effectiveness. An essential feature of a welder's tent is that it be not only durable, but also securable rigidly to the ground adjacent the pipe section being worked while being portable for continuous movement from one aligned pipe section to another.

Description of the prior art

Shaw (1,834,655) employs a flexible metal frame secured by magnet means to a portion of a pipe section being welded. Consequently, that section of the pipe which is being welded is in a sense shielded or protected by his tent. However, Shaw does not suggest the employment of a tent and frame encircling the entire pipe so as to effectively create a pipeline worker sealed zone.

Ashton (2,193,469) developed a flexible, transparent windshield including a bendable frame for adjustment of the windshield about an infant crib or the like. Again, there is no suggestion of circumferential engagement of an entire pipe section being worked.

Hall (2,698,629) is typical of the portable vehicle shelter art, the shelter frame being mounted on castors and including a series of longitudinally extending, vertically slidable bars for supporting canvas upon the frame.

SUMMARY OF THE INVENTION

According to the present invention a tent frame including two half-sections hingedly connected one to another, is supported upon the ground so as to encompass a pipe section being worked upon. A resilient, waterproof cover, such as 10-ounce, fire resistant olive drab, waterproof duck having grommet apertures, may be laced to the frame sections. At one end the tent is developed as a front pipe-engaging truncated form, extending from the apex of the frame downwardly for circumferential engagement of a pipe section being worked. Lace means are used to secure the truncated end section about the pipe. At the other end, the tent defines an opening for pipe worker access.

The waterproof cover may include vinyl or clear plastic window means, as well as vent means. The frame includes a plurality of spikes which can be driven in the ground, so as to rigidize the frame with respect to the pipe being worked upon. As the welder completes welding repair of a pipe section, the tent is readily movable along the pipe without removal therefrom. As the job is completed, the entire frame can be removed from the pipe and the individual half-section folded together upon hinges for transportal. Modification of invention includes the placing of an identical second welder's tent in longitudinally opposed relationship with its open end abutting the opening of the first welder's tent and the individual front truncated ends circumferentially secured to a pipe at separated points, so as to define a double-sized welder's tent.

DESCRIPTION OF THE PREFERRED EMBODIMENTS

Figure 1:
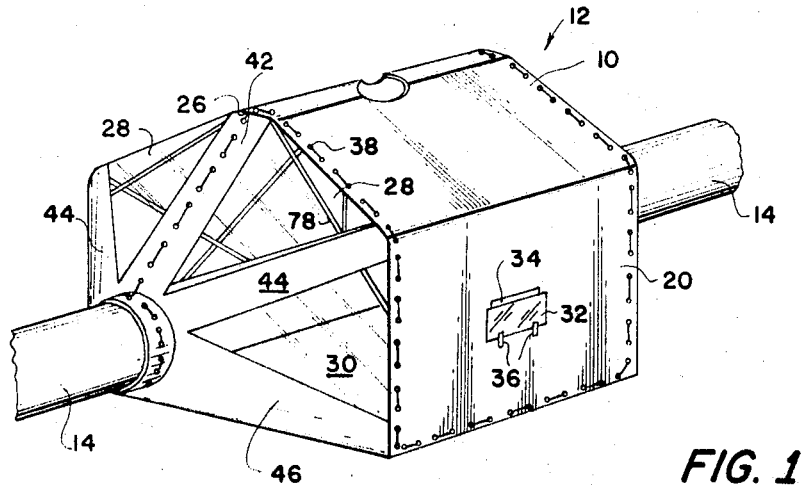
FIG. 1 is a perspective view of the welder's tent secured circumferentially about the pipe section being worked upon.

In FIG. 1 welder's tent 10 is generally illustrated as being supported upon collapsible frame 12 and secured at its truncated front end circumferentially of a pipeline section 14. The entire tent rests upon ground 16 adjacent the pipe being worked upon.

Figure 2:
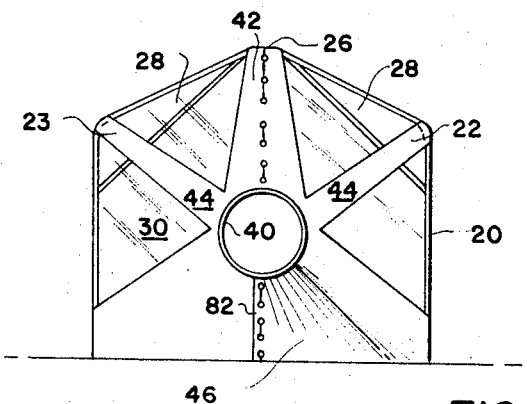
FIG. 2 is a front elevation thereof.
Figure 4:
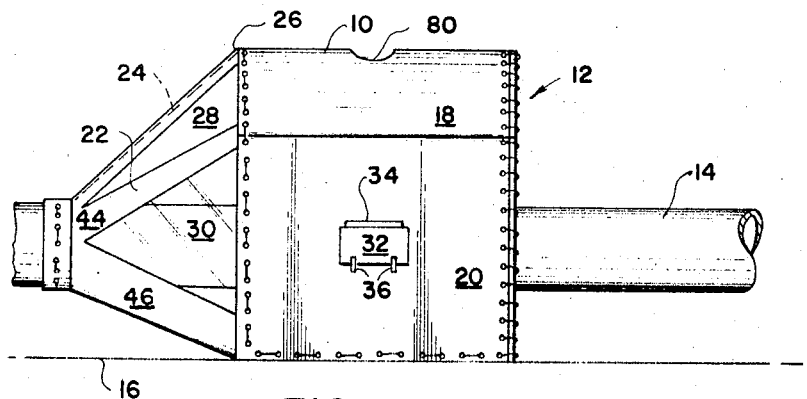
FIG. 4 is a side elevation.

In FIGS. 2 and 4 tent 10 is illustrated as comprised of top section 18, side section 20 and truncated front pipe collar pieces 22 and 23. A nylon rope 24 illustrated in phantom in FIG. 4, extends from pipe-engaging collar 40 to apex 26 of the individual frame half-sections, so as to support the truncated section above the pipe being worked. A plurality of radially extending windows 28 and 30 may be supported in the truncated front section intermediate central joining flanges 42 and radially extending flanges 44.

As illustrated in FIG. 2, skirt sections 46 depend from windows 30 and are securable one to the other beneath the pipe section being encircled by lace means extending through adjoining flanges 82.

Figure 3:
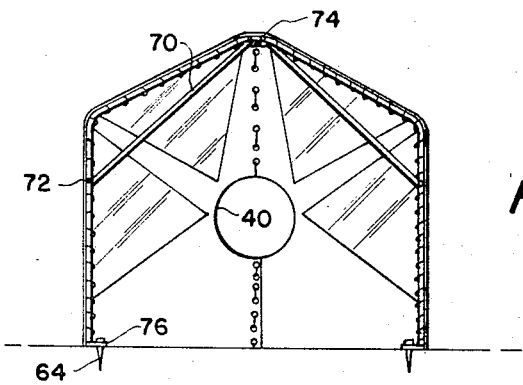
FIG. 3 is a rear elevation thereof.
Figure 6:
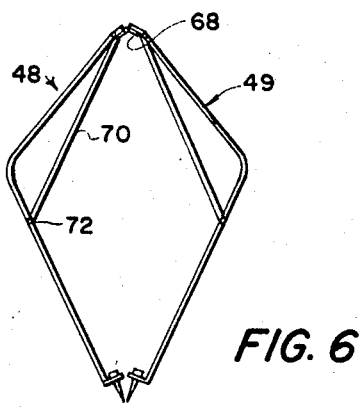
FIG. 6 is an end elevation of two frame half-sections folded upon hinges towards each other.
Figure 5:
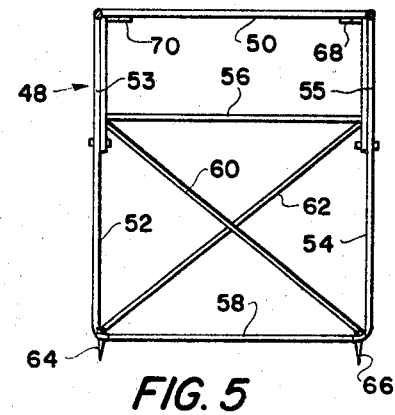
FIG. 5 is a side elevation of a frame half-section.
Figure 7:
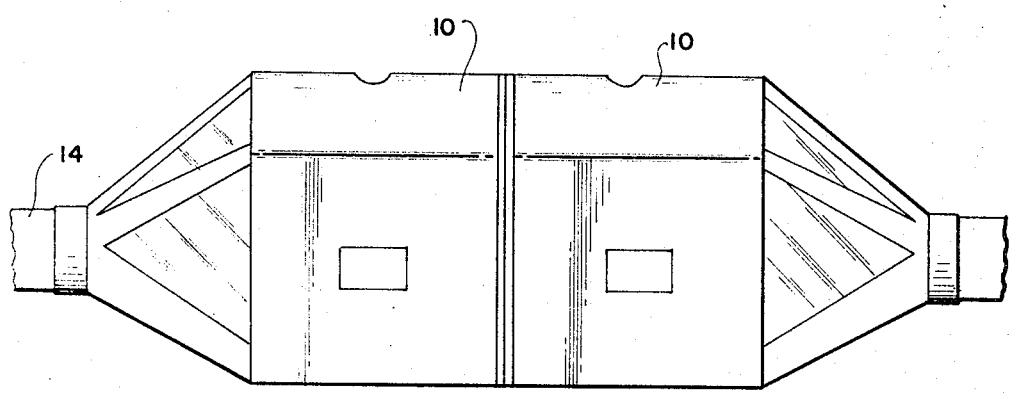
FIG. 7 is a schematic view of the modification wherein two tent sections are supported together in end to end relationship.

The collapsible frame sections are illustrated in FIGS. 3, 5, and 6 as comprising individual frame half-sections 48 and 49, identically constructed. Each frame half-section has vertical side struts 52 and 54 converging top struts 53 and 55 extending to top bar 50. A horizontal mid-bar 56 and a horizontal bottom bar 58 are rigidly supported one to the other by means of diagonal struts 60 and 62. Ground-engaging spikes 64 may extend through a plurality of brackets 76 affixed to horizontal member 58.

Ten inch steel hinges 68 and 70 may be secured to opposed bars 50, so as to hinge the half-sections together about a longitudinal axis. A pin means 74 may be employed to lock the hinges in open position.

Rear end struts 70 may extend from vertically extending struts 52 and 54 towards the converging top struts 53 and 55, being pivoted at their lower end by pin 72 and being releasably secured at hinges 50 by means of reciprocating pin 74. By withdrawing of pin 74 hinges 50 may be folded and the entire strut 70 may be pivoted to a position substantially parallel with upstanding members 52 and 54 so as to fold the deivce substantially flat.

A ten inch vent hole 80 may be provided in top section 18. Also optional plastic vinyl side windows 32 (for example .020 inch vinyl) may be secured to the side section 20 by means of a hinge 34 and fastened at the other end by grommets 36. By opening grommets 36 venting can be provided also through window 32. A fiber glass screen (not illustrated) may replace vent holt 80. As the pins are removed, the two half-sections 48 and 49 may be nested one to the other for flat transport.

As will be apparent, the welder's tent can be readily assembled by rigidizing the half-section frames to each other, then securement of the truncated end of the tent circumferentially of the pipe section being worked upon. Consequently, welders will be protected in all weather conditions and the device can be readily moved longitudinally by one or more men.

Manifestly, changes in construction of the frame and fitting of the cover about the pipe may be employed without departing from the spirit and scope of invention, as defined in the claims.

I claim:
1. Pipeline enclosure of the type attachable to a pipe section being worked upon and comprising:
   (A) a self-supported frame substantially enclosing said pipe section, said frame including:
      (i) two half-sections, hingedly connected to each other at their apex defined as a longitudinal axis above said pipe section, each half-section comprising a pair of vertically extending strut members and a pair of apex strut members extending from said upstanding members to said apex;
   (B) a cover secured to said frame, said cover at one end being attachable circumferentially of a pipe section and at its other end defining an opening for pipe worker access, said cover being of a resilient, water-proof material resiliently sewed to said frame and resiliently secured circumferentially about said pipe section and having:
      (i) a front pipe-engaging truncated section having a plurality of windows extending radially from the pipe.

2. A pipeline enclosure as in claim 1, said frame including a plurality of ground spikes attached at the bottom of said frame member half-sections, so as to extend from said frame into ground and brace said enclosure.

3. A pipeline enclosure as in claim 2, said frame half-section including a front and rear apex strut removable from said upstanding members and said apex by pin means.

4. A pipeline enclosure as in claim 3, said cover including means permitting venting therethrough.

5. A pipeline enclosure as in claim 3, including two pairs of half-sections placed in opposed relationship so that their front pipe-engaging truncated sections are secured outwardly to a pipe section and their openings for pipe worker access abut each to define an enclosed pipe worker area.

6. A pipeline enclosure as in claim 3, said front pipe-engaging truncated section having a pipe collar at one end and at its other end being connected to said frame section by a lace means, said front section being supported above said pipe by a resilient means extending from the pipe collar to said frame apex.

7. Pipeline enclosure as in claim 6, said front pipe-engaging truncated section including two sections attachable to each other above said resilient means and converging from said frame towards said collar.

8. Pipeline enclosure of the type attachable to a pipe section laid upon the ground being worked upon and comprising:
   (A) a self-supported frame substantially enclosing said pipe section, said frame including:
      (i) an apex defined as a longitudinal axis above said pipe section, and
      (ii) two sides extending from said apex around the side of said pipe so as to engage the ground on either side of said pipe each said side further including a vertically extending strut member and an apex strut member extending from said vertically extending strut member to said apex;
   (B) a cover secured to said frame, said cover at one end being attachable circumferentially of a pipe section and at its other end defining an opening for pipe worker access, said cover being of a resilient waterproof material resiliently secured to said frame and resiliently secured circumferentially about said pipe section and having
      (i) a front pipe-engaging truncated section having a plurality of windows extending radially from the pipe.

References Cited

UNITED STATES PATENTS

| 1,897,382 | 2/1933 | Blair | 135—1 XR |
| 2,363,916 | 11/1944 | Waterman et al. | 135—1 |
| 2,809,649 | 10/1957 | Druck | 135—8 |
| 3,004,542 | 10/1961 | Moody | 135—1 |

KENNETH DOWNEY, Primary Examiner.

U.S. Cl. X.R.

135—5